United States Patent [19]

Alvis

[11] Patent Number: 5,468,115
[45] Date of Patent: Nov. 21, 1995

[54] BILEVEL TRAILER WITH A LOWERABLE UPPER DECK

[76] Inventor: Brady A. Alvis, 298 69th St., North, Clearwater, Fla. 34624

[21] Appl. No.: 348,598
[22] Filed: Dec. 2, 1994
[51] Int. Cl.⁶ .................................................. B60P 1/02
[52] U.S. Cl. ........................ 414/556; 280/414.1; 414/462
[58] Field of Search .......................... 280/414.1; 410/26; 414/462, 917, 471, 546, 556, 559

[56] References Cited

U.S. PATENT DOCUMENTS

| | | |
|---|---|---|
| 4,221,420 | 9/1980 | Vencill et al. .......................... 296/1 A |
| 4,469,346 | 9/1984 | Low ..................................... 280/414.1 |
| 4,589,814 | 5/1986 | Cates .................................... 414/484 |
| 4,932,830 | 6/1990 | Woodburn ............................. 414/495 |
| 5,096,216 | 3/1992 | McCalla ............................. 280/414.1 |

OTHER PUBLICATIONS

These patents are cited by applicant in the Disclosure Statement filed Feb. 3, 1995.

*Primary Examiner*—Michael S. Huppert
*Assistant Examiner*—Janice L. Krizek
*Attorney, Agent, or Firm*—Harold D. Shall

[57] ABSTRACT

A bilevel trailer having upper and lower levels with four posts pivotally connected to both levels. A winch including a single cable connected by pulleys to all four posts with the winch moving said upper level between an upper position and a lower position resting on the lower level.

8 Claims, 3 Drawing Sheets

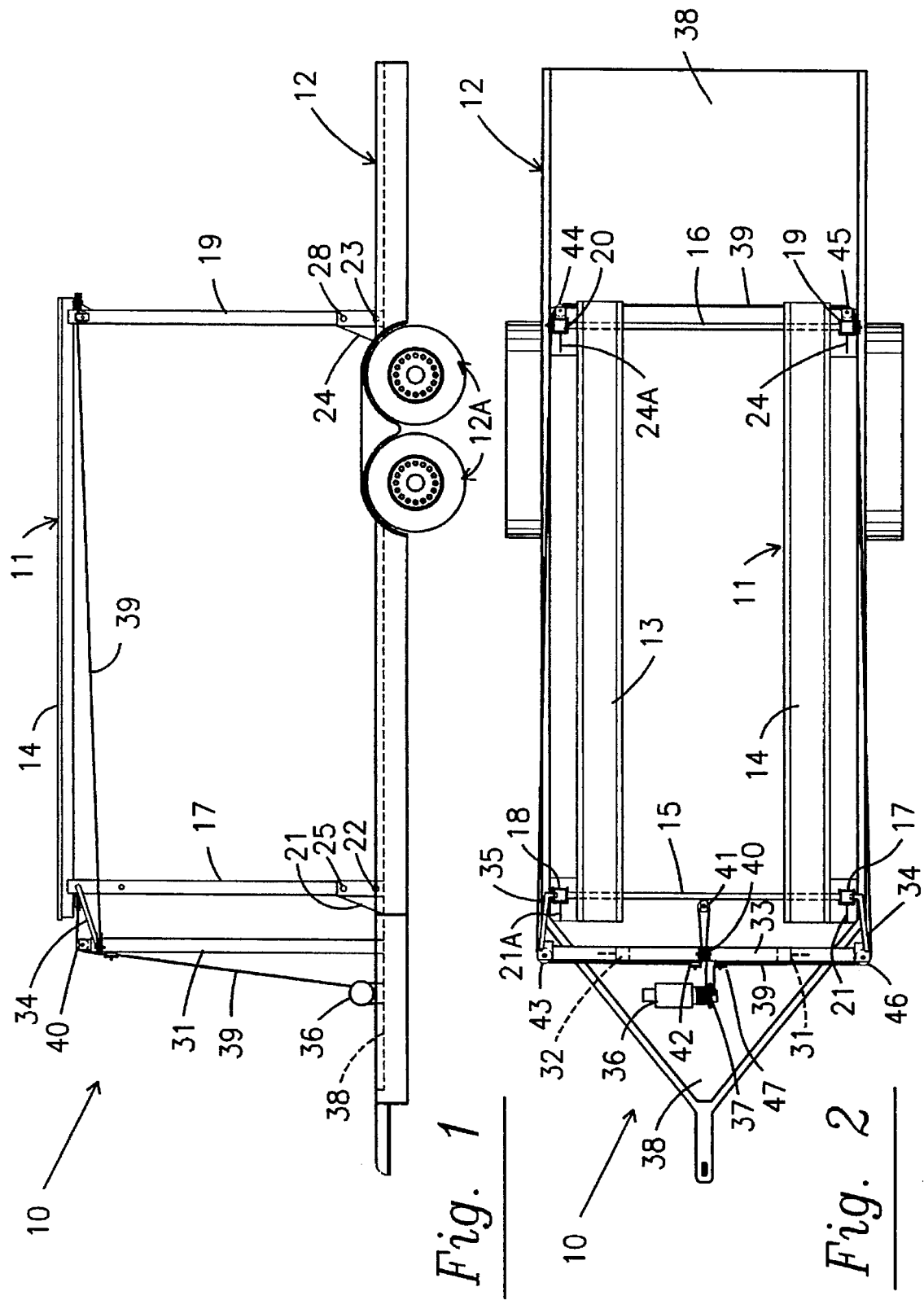

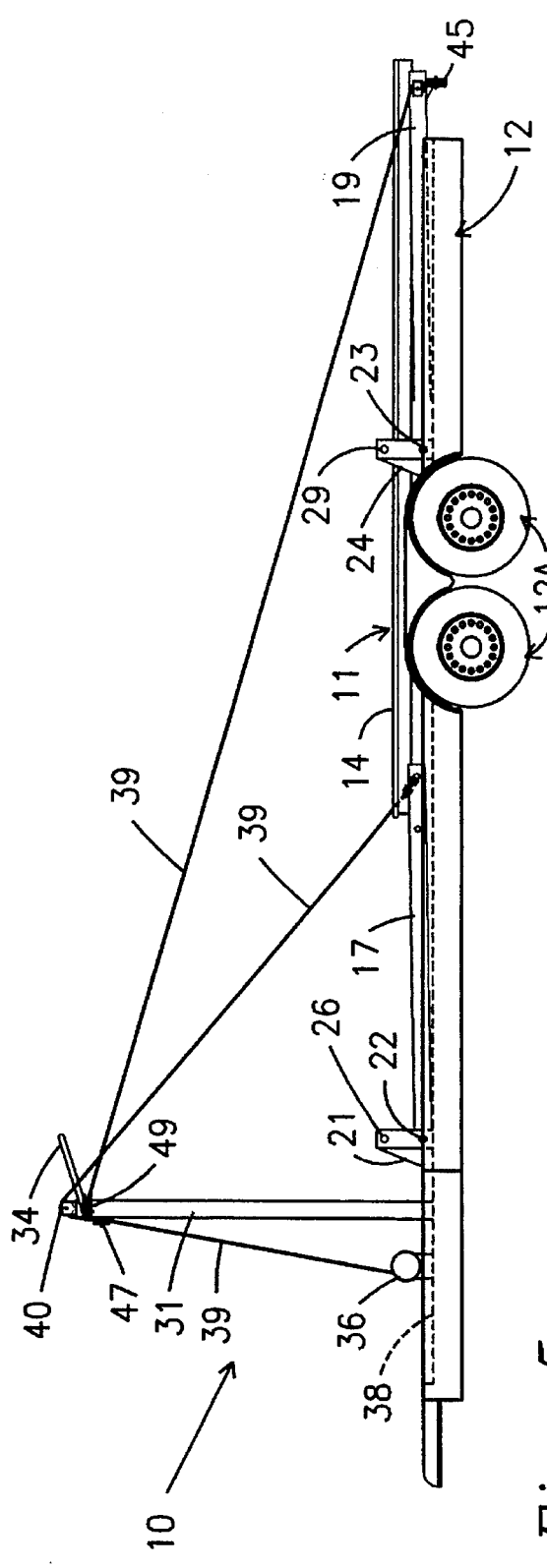
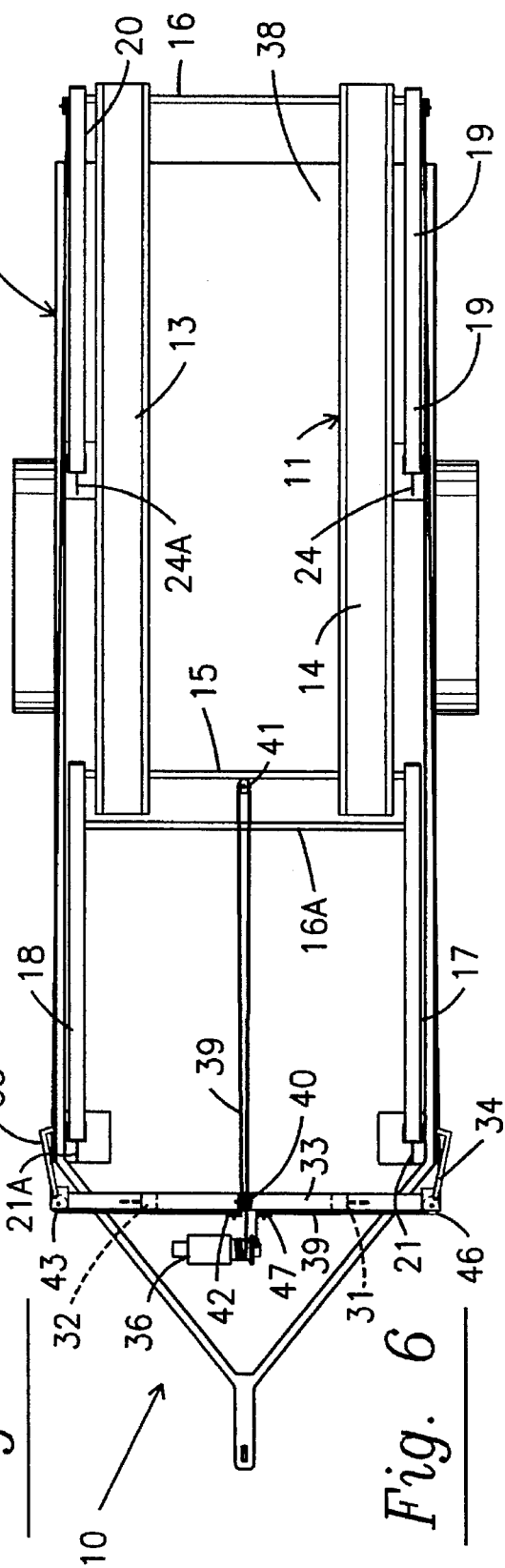

BILEVEL TRAILER WITH A LOWERABLE UPPER DECK

BACKGROUND OF THE INVENTION

1. Field of the Invention

This invention relates to bilevel trailers generally and more particularly to such a trailer having a lower deck for carrying a motor vehicle and a lowerable upper deck for carrying a second wheeled vehicle thereon such as a boat carrying boat trailer.

Many people take vacations in motor homes or other large recreational vehicles and tow therebehind a smaller motor vehicle to use once the vacation location has been reached. It is also desirable to take a second wheeled vehicle to use at the vacation destiny, such as a wheeled boat trailer having a boat thereon, golf cart or other wheeled vehicle.

2. Description of Prior Art

A trailer manufactured by Trailex Incorporated of Canfield, Ohio is such a bilevel trailer, however, the upper level must be cranked directly vertically upwardly and requires separated winches, front and rear to lift the upper level. A trailer shown in U.S. Pat. No. 4,932,830 is the bilevel type but again, as in the Trailex device, the upper level is winched vertically upwardly and has four fixed vertical posts, with a separate cable to each post to raise the upper level; U.S. Pat. No. 4,589,814 shows a bilevel trailer with a tiltable upper level, however, such device is for carrying boats only on the upper level and uses the same winch and cable for loading the boat on the upper level as it does for raising the upper level. Additionally, when tilted the whole trailer tilts and the rear thereof touches the ground. This would require a great loading effort to move the trailer to its driving configuration. U.S. Pat. No. 4,221,420 shows a bilevel trailer with the upper level again moving vertically and with a scissor arm arrangement connecting the upper and lower levels and hydraulic jacking means for raising the upper level.

SUMMARY OF THE INVENTION

None of the above prior art discloses a bilevel trailer of this invention where both the upper and lower levels of the trailer can accommodate wheeled vehicles, and the upper level is supported by four posts, one at each corner, which posts are pivotally connected to the upper and lower trailer levels and move so that when viewed from the side, front or back, the posts and the upper and lower levels maintain a continuous parallelogram configuration. A single winch with a continuous cable that passes around a pulley at the upper end of each of the rear posts and a single pulley connected by structure means to the pair of front posts, which cable is then connected at its terminal end to a fixed structure means on the trailer, is used to lower the upper level until it rests on the lower level and to raise the upper level until it is in its fully spaced relationship to the lower level. Lock pins are then inverted to retain the vertical posts and the upper level in place.

BRIEF DESCRIPTION OF THE DRAWINGS

FIG. 1 is a side elevational view of a bilevel trailer according to this invention;

FIG. 2 is a plan view of the trailer of FIG. 1;

FIG. 5 is a side elevational view of the trailer of FIG. 1 with the top level in its full down position; and FIG. 6 is a plan view of the trailer shown in its FIG. 5 position.

DETAILED DESCRIPTION OF THE PREFERRED EMBODIMENT

Figures 3, 4:
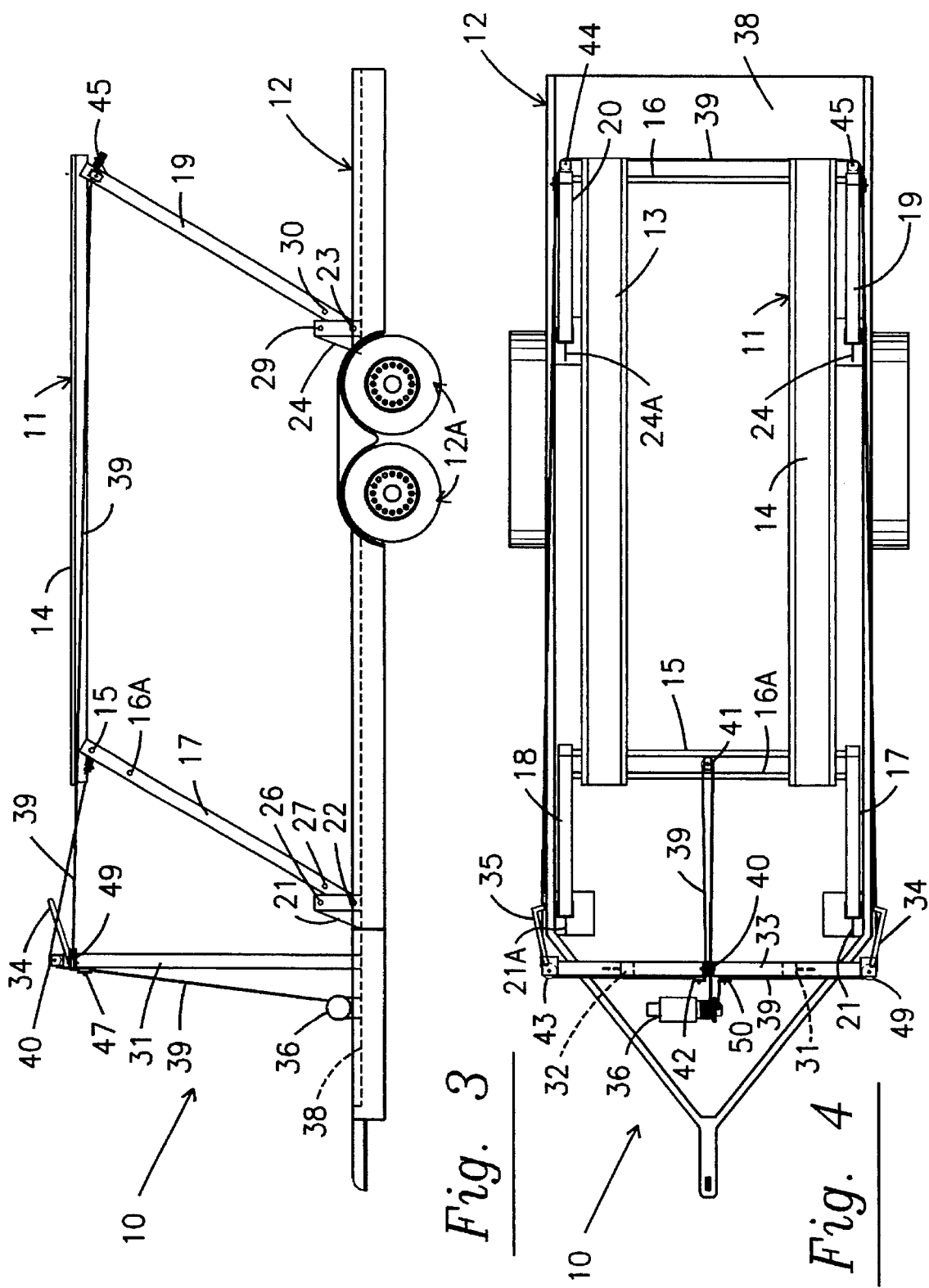
FIG. 3 is a side elevational view of the trailer of FIG. 1 in a position intermediate its raised and lowered positions.
FIG. 4 is a plan view of the trailer in the position shown in FIG. 3.

Referring now to the drawings, and more particularly to FIGS. 1 and 2, a bilevel trailer is shown generally at 10 and includes an upper level 11 and a lower level 12 carried by conventional ground wheels 12A, with the upper level 11 comprised of a pair of laterally spaced wheel tracks 13 and 14 interconnected at their forward (left) end by a transverse structural member in the form of a pipe 15 and at their rear (right) end by a transverse structural member in the form of a pipe 16. The upper level 11 is spaced vertically above the lower level 12 and supported thereabove by four posts, two posts 17 and 18 at the forward end of the upper level and two posts 19 and 20 at the rear end of the upper level. In the upright position shown in FIGS. 1 and 2, the posts extend vertically, whereas in the partially raised (or lowered) position, of FIGS. 3 and 4 the posts are inclined, yet parallel, and in the lowered position of FIGS. 5 and 6 they remain parallel.

The post 17 is pivotally connected at its lower end by a pivot pin 22, to a bracket 21 securedly carried by the lower level 12, which pivot pin 22 passes through registering openings in the bracket 21 and the post 17 and is retained in such openings by well known means. Likewise, the post 18 is connected by a similar pivot pin (not shown) to a bracket 21A securedly carried by the lower level 12. The post 19 is pivotally connected at its lower end by a pivot pin 23 to a bracket 24 securedly carried by the lower level 12, which pivot pin 23 passes through registering openings (not shown) in the bracket 24 and the post 19 and is retained in such openings by well known means. Likewise the post 20 is connected by a similar pivot pin (not shown) to a bracket 24A securedly carried by the lower level 12.

The upper level 11 is pivotally mounted to the forward posts 17 and 18 by means of the ends of the pipe 15 being pivotally mounted in a registering opening near the top of each of the posts 17 and 18, and is pivotally mounted to the rear posts 19 and 20 by means of the ends of the pipe 16 being pivotally mounted in a registering opening near the top of each of the posts 19 and 20. A pipe 16A is secured between the posts 17 and 18 to interconnect the same.

When the trailer 10 is in its upright position shown in FIGS. 1 and 2, a lock pin 25 is suitably secured in registering openings (see FIG. 3 for location of the openings) 26 and 27 in the bracket 21 and the post 17, respectively, to lock the post 17 in its upright position. Similarly, the post 18 is locked in an upright position by a pin (not shown) suitably secured in registering openings (not shown) in the bracket 21A and the post 18. Likewise, a lock pin 28 is suitably secured in registering openings 29 and 30 (see FIG. 3 for locations of the openings) in the bracket 24 and the post 19, respectively, to lock the post 19 in its upright position. Similarly, the post 20 is locked in an upright position by a pin (not shown) suitably secured in registering openings (not shown) in the bracket 24A and the post 20.

A pair of laterally spaced structural support members 31 and 32 are suitably securedly secured to the lower level 12 of the trailer 10 near the front end thereof and extend vertically thereabove to slightly below the height of the posts 17 and 18. A laterally extending horizontal structural member in the form of a beam 33 is secured to the top of members 31 and 32 and extends laterally therebeyond to a location just laterally past the posts 17 and 18. Pivotally secured to the top end of the beam 33 adjacent the post 17 is a locking arm 34 which as seen in FIGS. 1 and 2, can be pivoted inwardly to lock into the end of pipe 15 and, as seen in FIGS. 3 to 6, can be pivoted outwardly to unlock from pipe 15. Pivotally secured to the top end of the beam 33 adjacent the post 18 is a second locking arm 35 which can be pivoted inwardly to lock into the end of pipe 15, as seen in FIGS. 1 and 2, and, as seen in FIGS. 3 to 6, can be pivoted outwardly to unlock from pipe 15. When in the raised position of FIGS. 1 and 2, the arms 34 and 35, the pins 25 and 28 (and the other two pins like pins 25 and 28 which are not shown) are locked into the posts 17, 18, 19 and 20 and thereby retain the upper level 11 in its raised position.

Means are provided to raise and lower the upper level 11 between its position shown in FIGS. 1 and 2 and its position shown in FIGS. 5 and 6, with an intermediate position shown in FIGS. 3 and 4. More particularly, a winch 36, which can be manually operated, operated by electric motor or other suitable means, is secured to a bracket 37 which in turn is secured to the front end of the vehicle carrying deck 38 of the lower level 12. A single elongated cable 39 is connected to and manipulated by the winch 36 to raise and lower the upper level 11. The cable 39 first extends upwardly and passes over a first pulley 40, secured to the top of the beam 33, and then rearwardly and around a second pulley 41 carried by the pipe 15 at a location intermediate it ends, then forwardly and laterally around a third pulley 42 carried by the beam 33, then laterally outwardly and around a fourth pulley 43 carried by the outer end of the beam 33 (the upper outer end as seen in FIGS. 2, 4 and 6), then rearwardly and around a fifth pulley 44 carried by the post 20 adjacent the upper end thereof, then laterally (downwardly as seen in FIGS. 2, 4 and 6) to and around a sixth pulley 45 carried by the post 19 adjacent the upper end thereof, then forwardly and around a seventh pulley 46 carried by the end of the beam 33 (the lower end as seen in FIGS. 2, 4 and 6) then laterally to an eighth pulley 47 carried by the front of beam 33 adjacent the center thereof, and then downwardly to be fixedly secured to the bracket 37. It should be understood that additional pulleys, as needed, can be utilized between the aforementioned pulleys to guide the cable 39 through its extensive path, however, the aforementioned pulleys explain the operative path of the cable 39 for accomplishing its task of raising and lowering the upper level 11.

With the upper level 11 down and resting on the lower level 12, a vehicle can be driven up a ramp (not shown) and onto the upper level, however, it is contemplated that an item such as a boat carrying boat trailer can be backed by a towing vehicle pushing the trailer up the ramp and onto the upper level. The towing vehicle is detached from the boat trailer, moved away and the ramp is then removed, the trailer suitably tied down to the upper level 11, the upper level then raised by the winch 36 to its upper position and locked in place as hereinbefore described, the ramp is then placed on the lower level 12 and the towing vehicle driven onto the deck 38 of the lower level, the ramp is then removed and the towing vehicle suitably tied down to the lower level 12. The trailer 10, with its tied down load in place, is now ready to be drawn by a recreational vehicle or the like.

Although the above description relates to a presently preferred embodiment, numerous changes can be made therein without departing from the scope of this invention as claimed in the following claims.

What is claimed is:

1. A bilevel trailer comprising in combination,
    (a) a lower level having load carrying means thereon and including ground wheels,
    (b) an upper level having an upper position spaced vertically above said lower level and a lower position in which said upper level rests on and is solely supported by said lower level,
    (c) a pair of laterally spaced and parallel forward posts including means pivotally connecting the same to both said levels adjacent the forward end of said levels,
    (d) a pair of laterally spaced and parallel rearward posts including means pivotally connecting the same to both said levels adjacent the rearward end of said levels with said rearward posts being maintained in a continuous parallel relationship with said forward posts while the upper level is moved between its upper and lower positions,
    (e) releasable locking means for locking said posts in an upright position for holding said upper level in its upper position and for unlocking said posts whereby said upper level can move to its lower position resting on said lower level, and
    (f) moving means for moving said upper level between its upper and lower positions and for pivoting said posts about said pivotally connecting means while maintaining said posts and said levels in a parallelogram configuration,
        (1) said moving means including a winch means, a single elongated cable operatively connected to said winch means and pulley means connecting said cable to said posts.

2. The bilevel trailer according to claim 1 wherein said winch means is secured to said lower level.

3. The bilevel trailer according to claim 2 wherein said moving means includes support means securedly carried by said lower level and extending vertically thereabove.

4. The bilevel trailer according to claim 3 wherein said pulley means includes a first pulley means carried by said support means and over which said cable passes, a second pulley means connected to said forward posts and around which said cable passes, a third pulley means carried by said support means and about which said cable passes, and fourth pulley means connected to said rearward posts and about which said cable passes.

5. The bilevel trailer according to claim 4 wherein said fourth pulley means includes a pulley carried by each of said rearward posts.

6. The bilevel trailer according to claim 4 wherein the end of said cable remote from said winch includes means connecting said cable to said lower level.

7. The bilevel trailer according to claim 5 wherein the end of said cable remote from said winch includes connecting means connecting the cable to said lower level.

8. The bilevel trailer according to claim 7 wherein said pulley means also includes a fifth pulley means carried by said support means and over which said cable passes after passing said pulleys carried by said rear posts, and wherein after passing said fifth pulley means said cable means connects to said connecting means.

* * * * *